United States Patent
Zhong et al.

(10) Patent No.: US 10,121,256 B2
(45) Date of Patent: Nov. 6, 2018

(54) TEMPORAL SALIENCY MAP

(71) Applicants: QUALCOMM Incorporated, San Diego, CA (US); Xin Zhong, San Diego, CA (US); Yu Sun, San Diego, CA (US); Dashan Gao, San Diego, CA (US)

(72) Inventors: Xin Zhong, San Diego, CA (US); Yu Sun, San Diego, CA (US); Dashan Gao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 164 days.

(21) Appl. No.: 15/326,614

(22) PCT Filed: Aug. 28, 2014

(86) PCT No.: PCT/CN2014/085366
§ 371 (c)(1),
(2) Date: Jan. 16, 2017

(87) PCT Pub. No.: WO2016/029395
PCT Pub. Date: Mar. 3, 2016

(65) Prior Publication Data
US 2017/0200279 A1   Jul. 13, 2017

(51) Int. Cl.
*G06T 7/00* (2017.01)
*G06T 7/246* (2017.01)
(Continued)

(52) U.S. Cl.
CPC ............... *G06T 7/248* (2017.01); *G06T 7/11* (2017.01); *G06T 7/174* (2017.01); *G06T 7/187* (2017.01);
(Continued)

(58) Field of Classification Search
CPC ......... G06T 7/248; G06T 7/187; G06T 7/194; G06T 7/11
See application file for complete search history.

(56) References Cited

U.S. PATENT DOCUMENTS

2007/0003130 A1   1/2007   Goerick et al.
2009/0263038 A1  10/2009   Luo et al.
(Continued)

FOREIGN PATENT DOCUMENTS

CN          103400129 A    11/2013

OTHER PUBLICATIONS

Supplementary European Search Report—EP14900452—Search Authority—Munich—dated Dec. 8, 2017.
(Continued)

*Primary Examiner* — Kim Y Vu
*Assistant Examiner* — Molly Delaney
(74) *Attorney, Agent, or Firm* — Toler Law Group, PC

(57) ABSTRACT

A method of generating a temporal saliency map is disclosed. In a particular embodiment, the method includes receiving an object bounding box from an object tracker. The method includes cropping a video frame based at least in part on the object bounding box to generate a cropped image. The method further includes performing spatial dual segmentation on the cropped image to generate an initial mask and performing temporal mask refinement on the initial mask to generate a refined mask. The method also includes generating a temporal saliency map based at least in part on the refined mask.

30 Claims, 12 Drawing Sheets

(51) Int. Cl.
- *G06T 7/11* (2017.01)
- *G06T 7/174* (2017.01)
- *G06T 7/187* (2017.01)
- *G06T 7/194* (2017.01)

(52) U.S. Cl.
CPC .... *G06T 7/194* (2017.01); *G06T 2207/10016* (2013.01); *G06T 2207/20132* (2013.01); *G06T 2207/20156* (2013.01); *G06T 2207/20164* (2013.01); *G06T 2207/30201* (2013.01)

(56) References Cited

U.S. PATENT DOCUMENTS

2009/0304231 A1 12/2009 Lu et al.
2016/0086052 A1* 3/2016 Piekniewski ............. G06T 7/90
382/103

OTHER PUBLICATIONS

International Search Report and Written Opinion—PCT/CN2014/085366—ISA/EPO—dated Jun. 3, 2015.
Luo Y, et al., "Saliency Density Maximization for Efficient Visual Objects Discovery", IEEE Transactions on Circuits and Systems for Video Technology, Dec. 31, 2011, vol. 21, No. 12, pp. 1822-1834.

* cited by examiner

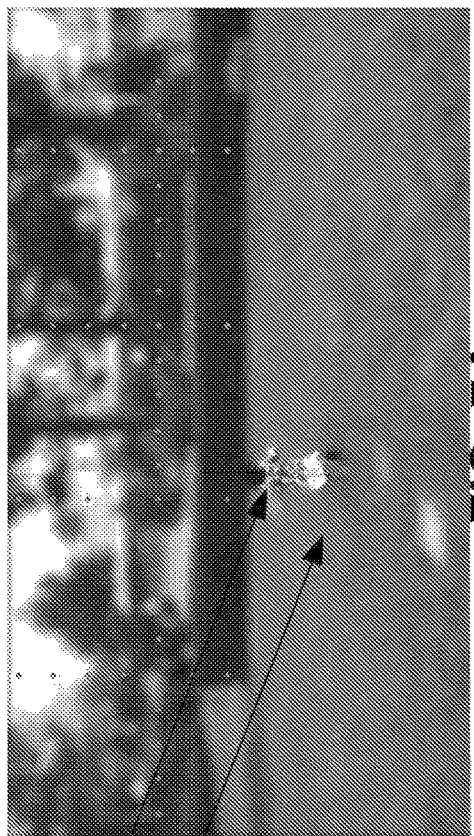
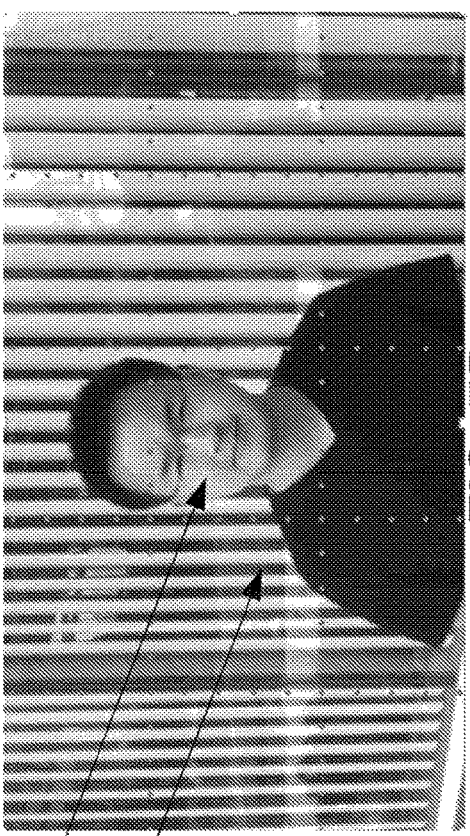
FIG. 7A
FIG. 7B
Sharp
Out of Focus
Bokeh Effect 702
Color
Black and White
Black & White Effect 704
700

TEMPORAL SALIENCY MAP

I. FIELD

The present disclosure is generally related to object tracking.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Applying special effects to an object that is being tracked between video frames may be desirable. However, applying various special effects using a typical bounding box may result in an unsatisfactory user experience. For example, sudden transitions may exist in the application of the special effects at or near the edges of the bounding box, resulting in unrealistic and aesthetically unpleasing images.

III. SUMMARY

The present disclosure describes a temporal saliency map that may be used for object tracking. In some cases, the temporal saliency map may be used to apply a special effect (e.g., a Bokeh effect where out-of-focus parts of an image are blurred, a black and white effect, or a lens effect, among other alternatives) to an object that is being tracked by an object tracker. Such special effects may be applied in a camera preview mode, a video recording mode, or a snapshot mode, among other alternatives. In a special effect application, the temporal saliency map may provide an improved user experience by applying the special effect to a subset of pixels identified as a foreground portion of an image (including an object of interest) while not applying the special effect to pixels identified as a background portion of the image.

In a particular example, a method of generating a temporal saliency map is disclosed. The method includes receiving an object bounding box from an object tracker and cropping a video frame based at least in part on the object bounding box to generate a cropped image. The method further includes performing spatial dual-layer segmentation on the cropped image to generate an initial mask and performing temporal mask refinement on the initial mask to generate a refined mask. The method also includes generating a temporal saliency map based at least in part on the refined mask.

In another particular example, an apparatus for generating a temporal saliency map is disclosed. The apparatus includes a processor, an object tracker component, a frame cropping component, a segmentation component, a mask refinement component, and a temporal saliency map generation component. The object tracker component is executable by the processor to generate an object bounding box. The frame cropping component is executable by the processor to crop a video frame based at least in part on the object bounding box to generate a cropped image. The segmentation component is executable by the processor to perform spatial multiple-layer segmentation on the cropped image to generate an initial mask, and the mask refinement component is executable by the processor to perform temporal mask refinement on the initial mask to generate a refined mask. The temporal saliency map generation component is executable by the processor to generate a temporal saliency map based at least in part on the refined mask.

In another particular example, a method of generating a temporal saliency map to be provided as feedback to an object tracker is disclosed. The method includes receiving an object bounding box from an object tracker and performing spatial dual-layer segmentation on a portion of a video frame to generate an initial mask. A boundary of the portion of the video frame is determined based at least in part on the object bounding box. The method includes performing temporal mask refinement on the initial mask to generate a refined mask and generating a temporal saliency map based at least in part on the refined mask. The method may include providing the temporal saliency map as feedback to the object tracker.

In another particular example, an apparatus for generating a temporal saliency map to be provided as feedback to an object tracker is disclosed. The apparatus includes a processor, an object tracker component, a segmentation component, a mask refinement component, and a temporal saliency map generation component. The object tracker component is executable by the processor to generate an object bounding box. The segmentation component is executable by the processor to perform spatial dual-layer segmentation on a portion of a video frame to generate an initial mask, where a boundary of the portion of the video frame is determined based at least in part on the object bounding box. The mask refinement component is executable by the processor to perform temporal mask refinement on the initial mask to generate a refined mask. The temporal saliency map generation component is executable by the processor to generate a temporal saliency map based at least in part on the refined mask and to provide the temporal saliency map as feedback to the object tracker component.

One particular advantage provided by at least one of the disclosed examples is an improved user experience when applying a special effect to an object of interest that is being tracked.

Another advantage provided by at least one of the disclosed examples is to improve a tracking accuracy of an object tracker by providing the saliency map as feedback to the object tracker in order to separate a foreground object from a background.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

FIG. 7A is a diagram of a particular illustrative embodiment of a first special effect being applied to a particular video frame based on a temporal saliency map;

FIG. 7B is a diagram of a particular illustrative embodiment of a second special effect being applied to a particular video frame based on a temporal saliency map;

V. DETAILED DESCRIPTION

Figure 1:
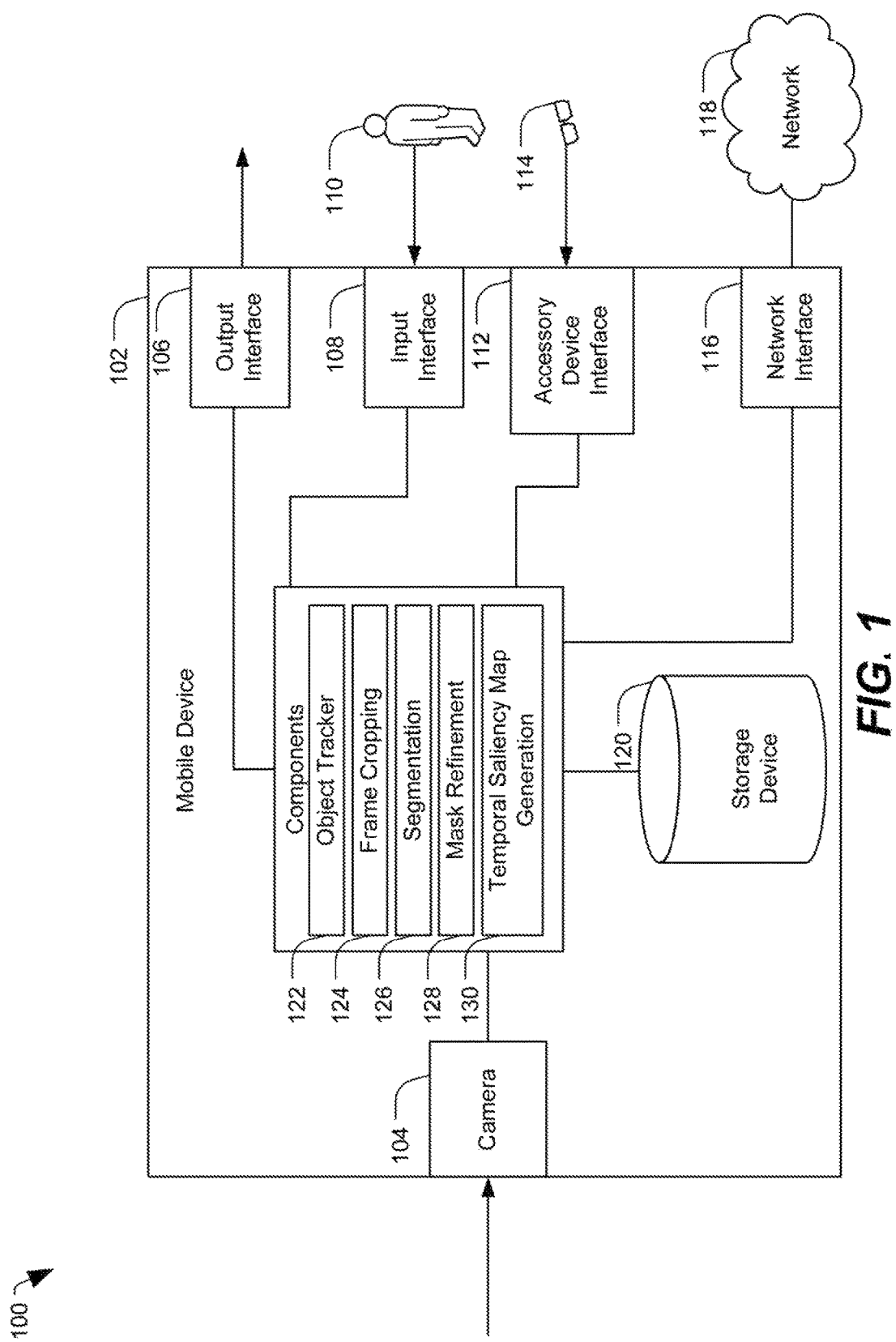
FIG. 1 is a block diagram of a particular illustrative embodiment of a system that is operable to generate a temporal saliency map.

Referring to FIG. 1, a particular illustrative embodiment of a system that is operable to generate a temporal saliency map is disclosed and generally designated 100. The system 100 includes a mobile device 102. The mobile device 102 may be a mobile phone, a music player, a video player, an entertainment unit, a navigation device, a communications device, a personal digital assistant (PDA), a computer, or any other mobile computing device. The mobile device 102 includes a camera 104. The camera 104 may be configured to capture and output still images and videos. The mobile device 102 includes an output interface 106. The output interface 106 may be configured to communicate with a display device, such as a liquid crystal display (LCD), a light emitting diode (LED) display, or any other display device. In a particular embodiment, the output interface 106 outputs a graphical user interface (GUI). The mobile device 102 further includes an input interface 108. The input interface 108 may include a touch screen, any other type of input device, or any combination thereof. In particular embodiments, the input interface 108 may be configured to receive input from a user 110 (e.g., input responsive to a GUI output by the output interface 106).

The mobile device 102 may further include an accessory device interface 112. In a particular embodiment, the accessory device interface 112 receives input from an accessory device 114. In a particular embodiment, the accessory device 114 includes a camera. The input received from the accessory device 114 may include image or video data. In a particular embodiment the accessory device 114 may be embedded in a user wearable accessory, such as eyeglasses or jewelry.

The mobile device 102 may further include a network interface 116 configured to communicate with a network 118. The network interface 116 may include an Ethernet interface, an 802.11 (WiFi) interface, a Long Term Evolution (LTE) interface, a Code Division Multiple Access (CDMA) interface, a Time Division Multiple Access (TDMA) interface, an 802.16 (WiMAX) interface, any other wired or wireless network interface, or any combination thereof.

The mobile device 102 further includes a storage device 120. The storage device 120 may include a solid state drive, a hard disk drive, an optical drive, or any other type of computer readable storage medium or device. The storage device 120 may store images and videos (e.g., images and videos that are captured by the camera 104, downloaded by the mobile device 102 via the network interface 116, etc.).

The mobile device 102 may include one or more components that are implemented in software (e.g., instructions stored in a memory of the mobile device 102 that are executable by a processor of the mobile device 102). Alternatively, all or part of the component(s) may be implemented in hardware. The component(s) may include an object tracker 122 that receives, via user input, selections of one or more objects included (e.g., depicted) in an image or a frame of video. The object tracker 122 may be configured to track an object in response to an input received from the user 110. In some cases, the object tracker 122 may generate an object bounding box (e.g., a set of X,Y coordinates) for tracking the object.

A frame cropping component 124 may be executable the processor of the mobile device 102 to crop a video frame (e.g., received from the camera 104) based at least in part on the object bounding box to generate a cropped image. A segmentation component 126 may be executable by the processor to perform spatial dual segmentation on the cropped image to generate an initial mask. A mask refinement component 128 may be executable by the processor to perform temporal mask refinement on the initial mask to generate a refined mask. A temporal saliency map generation component 130 may be executable by the processor to generate a temporal saliency map based at least in part on the refined mask. In some embodiments, the temporal saliency map generation component 130 may be configured to provide the temporal saliency map as feedback to the object tracker component 122. Examples of operation of the system 100 are further described with reference to FIGS. 2-11.

Figure 2:
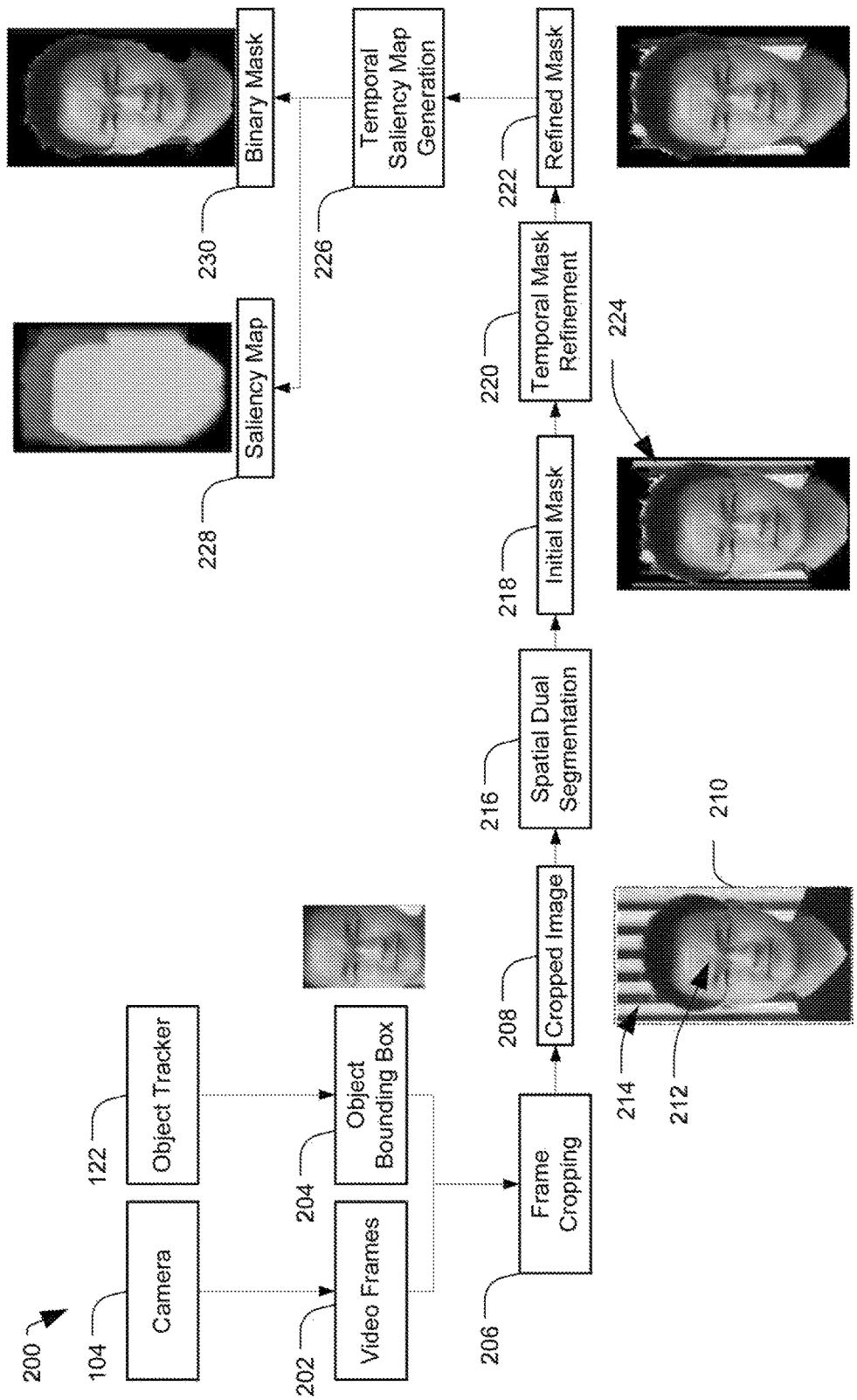
FIG. 2 is a block diagram of a particular illustrative embodiment of a method of generating a temporal saliency map.

Referring to FIG. 2, a particular illustrative embodiment of a method of generating a temporal saliency map is disclosed and generally designated 200. FIG. 2 illustrates that multiple-layer segmentation may be used to generate an object mask. FIG. 2 further illustrates that a temporal saliency map may be generated by temporally refining masks between video frames. The temporal saliency map may provide an accurate boundary that separates an object that is being tracked (the foreground object) from the non-object (the background objects) and may allow a gradual change from the foreground object to the background objects. In some embodiments, the temporal saliency map may be used in various special effect applications where the gradual change may result in an improved user experience (e.g., due to more aesthetically pleasing application of a special effect).

FIG. 2 illustrates that the camera 104 may provide a sequence of video frames 202, and the object tracker 122 may track an object of interest by generating an object bounding box 204. In some cases, the object tracker 122 may include a "touch to track" or T2T tracker that may be configured to generate the object bounding box 204 in response to a user input (e.g., a single touch input). After the object of interest has been identified in response to the user input and an initial object bounding box has been defined, the object tracker 122 may track the object of interest between video frames 202 by moving the object bounding box 204 responsive to movement of the object.

Based on the object bounding box 204 that is output by the object tracker 122, individual video frames 202 may be cropped by performing frame cropping 206 to generate a cropped image 208. In some cases, the frame cropping 206 may include determining a portion of a particular video frame of the video frames 202 that is associated with the object bounding box 204 and increasing a size of the object bounding box 204 to generate an expanded object bounding box 210. In some cases, the frame cropping 206 may include receiving X,Y coordinates of corners of the object bounding box 204, a height/width/diagonal size of the object bounding box 204, etc. The expanded object bounding box 210 may capture not only pixels associated with a foreground portion 212 of the particular video frame but also additional pixels associated with a background portion 214 of the particular video frame. As an illustrative, non-limiting example, the frame cropping 206 may include increasing the size of the object bounding box 204 by 30% in both the X direction and the Y direction from a center point and generating the cropped image 208 by determining pixels of the particular video frame that are within the expanded object bounding box 210. To illustrate, in the example of FIG. 3, the expanded object bounding box 210 may include additional pixels associated with a person's neck that may be useful for growing a mask for object tracking purposes.

FIG. 2 illustrates that spatial multiple-layer (e.g., dual) segmentation 216 may be performed on the cropped image 208. In some cases, the segmentation may include color-based segmentation using seeded region growing with a multiple-layer seed points definition. To illustrate, a first layer ("Layer 1") may use a cropped boundary (e.g., the rectangular expanded object bounding box 210 in the example of FIG. 2) as seed points for region growing to the inside, while a second layer ("Layer 2") may use a reduced size boundary (e.g., reduced in size by two-thirds) as seed points for growing to the outside. That is, the spatial dual segmentation 216 may include region growing inward from the expanded object bounding box 210 as well as region growing outward from the reduced size boundary. An initial mask 218 may be generated by fusing the results of the region growing associated with the two layers.

FIG. 2 illustrates that temporal mask refinement 220 may be performed on the initial mask 218 in order to generate a refined mask 222. The temporal mask refinement 220 may be used to align the initial mask 218 (e.g., associated with frame i) with one or more masks associated with one or more previous video frames (e.g., video frames i–1 to i-k). The temporal mask refinement 220 may be used to remove one or more pixels that may represent outliers for a particular video frame. To illustrate, if a particular pixel appears in the particular video frame (associated with video frame i) but does not appear in previous video frame(s) of the video frames 202, the pixel may represent an outlier and may be removed. Referring to the example of FIG. 2, pixels associated with the window blinds in the background portion 214 in the initial mask 218 are identified by reference number 224. However, the pixels 224 associated with the window blinds may not appear in previous frames. Accordingly, as illustrated in the refined mask 222, the pixels 224 may be determined to be outliers that are not associated with the foreground portion 212 of the image and may be removed as part of the temporal mask refinement 220.

In some cases, the temporal mask refinement 220 includes region filtering to "best fit" the initial mask 218 on masks that were generated during processing of multiple previous video frames (e.g., video frames i–1 to i-k). In this case, the temporal mask refinement 220 may include determining pixels that represent "best fits" for inclusion in the refined mask 222. As an illustrative, non-limiting example, five previous video frames may be analyzed (e.g., video frames i–1 to i–5, for frame i). In the event that a particular pixel is located in a majority of the five previous video frames (i.e., in at least 3 of the 5 previous video frames), the particular pixel may be included as part of the refined mask 222. By contrast, if the particular pixel is not located in the majority of the five previous video frames (i.e., in 2 or fewer video frames of the 5 previous video frames), the particular pixel may be excluded from the refined mask 222.

FIG. 2 illustrates that temporal saliency map generation 226 may be performed. The temporal saliency map generation 226 includes an accumulation of current and previous refined masks to generate a saliency map 228. In a particular embodiment, the saliency map 228 may be determined based on the following formula:

$$OS_i = W_o \times OS_{i-1} + (1-W_o) * \text{Mask}_i$$

In the above formula, $OS_i$ represents the saliency map 228 associated with a particular video frame (e.g., frame i), $W_o$ represents a first weighting factor (e.g., 0.95 in some cases), $OS_{i-1}$ represents a saliency map determined for a previous video frame (e.g., frame i–1), $(1-W_o)$ represents a second weighting factor (e.g., 0.05 in some cases), and $\text{Mask}_i$ represents the refined mask 222 for the particular video frame (e.g., frame i). Applying a high weight (e.g., where $W_o$=0.95) to the previous frame's saliency map may allow for a smooth change of object boundary. It will be appreciated that the values of 0.95 and 0.05 are for illustrative purposes only and that alternative values may be used to weight the saliency map for the previous frame and/or the refined mask.

Figure 3:
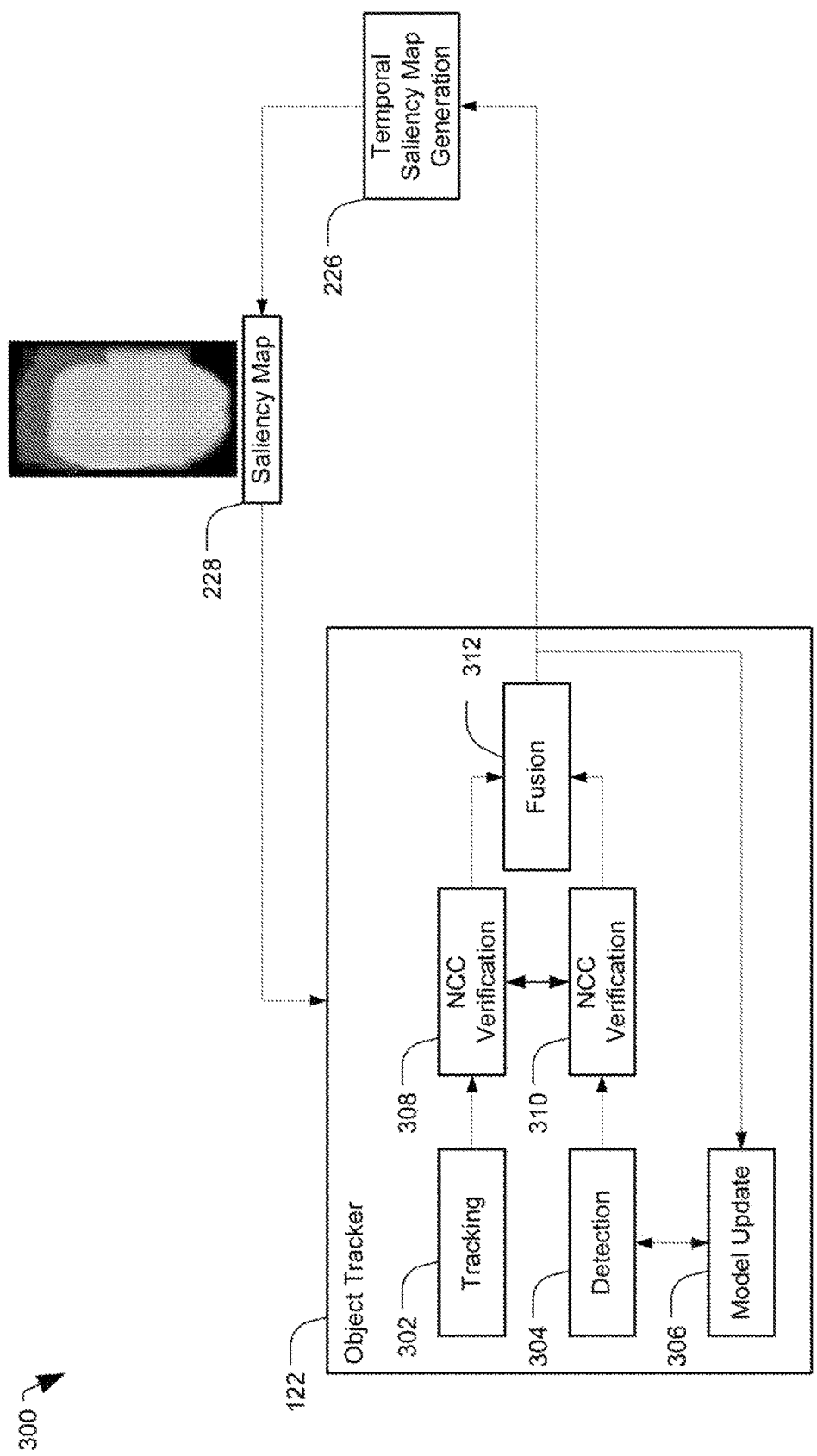
FIG. 3 is a block diagram of a particular illustrative embodiment of a method of providing a temporal saliency map as feedback to an object tracker.

In a particular embodiment, the saliency map 228 may be used as a two-dimensional filter for one or more special effects applications. A binary mask 230 may represent a threshold filter applied to the saliency map 228. In the example of FIG. 3, the saliency map 228 is a grayscale image, with individual pixels in the saliency map 228 having a value ranging from 0 to 255. Accordingly, the threshold that is used to generate the binary mask 230 from the saliency map 228 may include any value from 0 to 255. A pixel having a value above the threshold may be used for the binary mask 230 (e.g., replaced with a value of one), while a pixel having a value below the threshold may be excluded (e.g., replaced with a value of zero). In some examples, only the saliency map 228 may be generated without generating the binary mask 230.

As shown in the example of FIG. 2, the result of applying the binary mask 230 is to "zero out" the portion of the video frame that represents background noise (appearing as black), with the remaining portion of the video frame representing the foreground portion. The foreground portion may be used for various special effects applications including but not limited to a Bokeh effect application (as illustrated in the example of FIG. 7A) or a black and white effect application (as illustrated in the example of FIG. 7B).

Thus, FIG. 2 illustrates that spatial multiple-layer segmentation may be used to generate an initial mask, which may be temporally refined to generate a refined mask that is used to generate a temporal saliency map. In some cases, the saliency map 228 may be used for various special effects applications. For example, the saliency map 228 may be used to highlight an object by creating a Bokeh effect, a tilt-shift effect, or a black-white effect, among other alternatives. The saliency map 228 illustrated in FIG. 2 represents a well-defined saliency map that is consistent with the tracked object, which may allow such special color or filtering techniques to be applied while obtaining a realistic visual effect that may not be possible with a traditional definition of an object via a bounding box.

Referring to FIG. 3, a particular embodiment of a method of providing a temporal saliency map as feedback to an object tracker is illustrated and generally designated 300. FIG. 3 illustrates that the saliency map 228 may be used not only for special effect applications but also as feedback to the object tracker 122, potentially resulting in more robust object tracking.

In the example of FIG. 3, the object tracker 122 includes a tracking component 302, a detection component 304, and a model update component 306. Further, the object tracker 122 includes a first normalized cross-correlation (NCC) verification component 308 associated with the tracking component 302 as well as a second NCC verification component 310 associated with the detection component 304. An output of the tracking component 302 may be provided to the first NCC verification component 308, while an output of the detection component 304 may be provided to the second NCC verification component 310. The object tracker 122 further includes a fusion component 312 to receive an output from the first NCC verification component 308 and an output from the second NCC verification component 310. An output of the fusion component 312 may be used for the temporal saliency map generation 226 described with respect to FIG. 2.

FIG. 3 illustrates a particular embodiment in which the saliency map 228 may be provided as an input to the object tracker 122. Both NCC verification components 308 and 310 may be used for object verification based on an object appearance model. In some cases, both NCC verification components 308 and 310 may be enhanced by applying the saliency map 228 to separate a foreground portion of an image that includes an object of interest from a background portion of the image, potentially resulting in higher tracking accuracy. To illustrate, both NCC verification components 308 and 310 may normally use all pixels inside a bounding box for comparison. The saliency map 228 may be used to narrow down the number of pixels inside the bounding box that are to be used for comparison purposes. Thus, FIG. 3 illustrates that the saliency map 228 may be used not only for special effects applications but also as feedback to the object tracker 122, potentially resulting in more robust object tracking.

Figure 4:
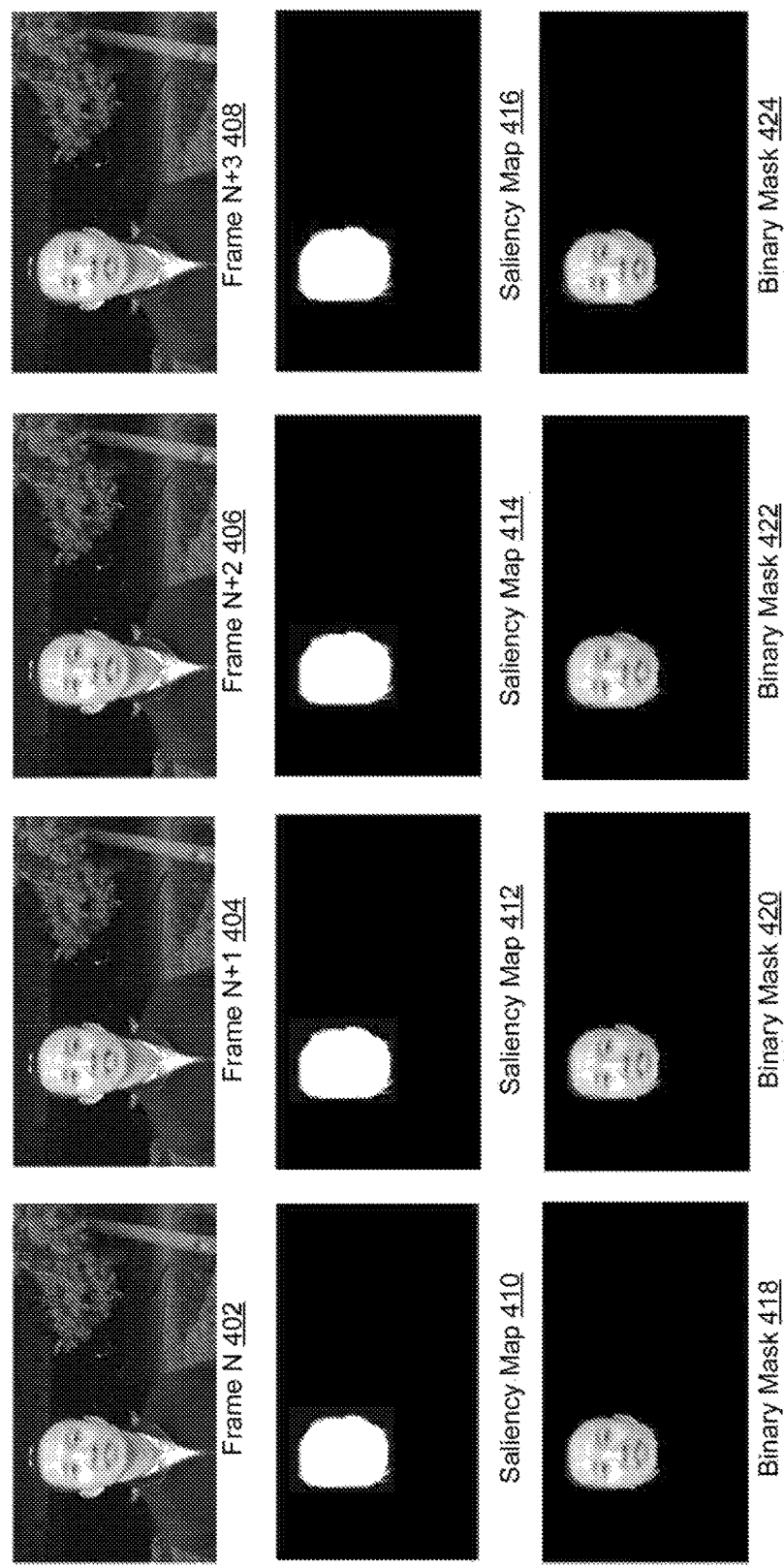
FIG. 4 is a diagram of a particular illustrative embodiment of saliency maps and associated binary masks being applied to a sequence of video frames.

Referring to FIG. 4, a particular illustrative embodiment of a method of applying saliency maps and associated binary masks to a sequence of video frames is illustrated and generally designated 400. FIG. 4 illustrates multiple video frames selected from a video frame sequence, along with saliency maps and binary masks associated with each of the video frames. FIG. 4 illustrates that multiple video frames may be used to temporally refine a mask in order to generate a temporal saliency map.

In the example illustrated in FIG. 4, selected video frames from the video frame sequence include a first video frame 402 ("Frame N"), a second video frame 404 ("Frame N+1"), a third video frame 406 ("Frame N+2"), and a fourth video frame 408 ("Frame N+3"). A first saliency map 410 is associated with the first video frame 402, a second saliency map 412 is associated with the second video frame 404, a third saliency map 414 is associated with the third video frame 406, and a fourth saliency map 416 is associated with the fourth video frame 408. A first binary mask 418 is associated with the first saliency map 410, a second binary mask 420 is associated with the second saliency map 412, a third binary mask 422 is associated with the third saliency map 414, and a fourth binary mask 424 is associated with the fourth saliency map 416.

In a particular embodiment, the first saliency map 410 may be generated by frame cropping along with spatial dual-layer segmentation to generate a mask. For example, the first video frame 402 ("Frame N") may be cropped to generate a cropped image, and spatial dual-layer segmentation may be performed on the cropped image to generate a mask, as described above with respect to FIG. 2. In the example of FIG. 4, the first saliency map 410 illustrates a first set of pixels that are determined to be associated with a foreground portion (e.g., a face) of the first video frame 402 and another set of pixels that are determined to be associated with a background portion of the first video frame 402. As shown in the example of FIG. 4, the result of applying the first binary mask 418 is to zero out the background portion of the first video frame 402 (appearing as black).

FIG. 4 further illustrates temporal refinement of the first saliency map 410 over the selected sequence of video frames. In a particular embodiment, the second video frame 404 ("Frame N+1") may be cropped to generate a second cropped image, and spatial dual-layer segmentation may be performed on the second cropped image to generate an initial mask, as described above with respect to FIG. 2. Temporal mask refinement may be performed to generate a refined mask, and the refined mask may be used for temporal saliency map generation, as described above with respect to FIG. 2.

In a particular embodiment, the saliency map 412 associated with the second video frame 404 may represent a temporal saliency map that is generated based on the following formula:

$$OS_i = W_o \times OS_{i-1} + (1-W_o)*Mask_i$$

In the above formula, $OS_i$ represents the saliency map 412 associated with the second video frame 404 ("Frame N+1"), $W_o$ represents a weighting factor (e.g., 0.95 in some cases), $OS_{i-1}$ represents the saliency map 410 associated with the first video frame 402 ("Frame N"), and $Mask_i$ represents the refined mask for the second video frame 404. Applying a high weight (e.g., where $W_o$=0.95) to the saliency map of the previous frame (the first video frame 402 in this case) may allow for a smooth change of object boundary. It will be appreciated that the values of 0.95 and 0.05 are for illustrative purposes only and that alternative values may be used to weight the saliency map for the previous frame and/or the refined mask. As shown in the example of FIG. 4, the result of applying the second binary mask 420 is to zero out the background portion of the second video frame 404 (appearing as black).

The third video frame 406 ("Frame N+2") may be cropped to generate a third cropped image, and spatial dual-layer segmentation may be performed on the third cropped image to generate an initial mask, as described above with respect to FIG. 2. Temporal mask refinement may be performed to generate a refined mask, and the refined mask may be used for temporal saliency map generation, as described above with respect to FIG. 2.

To illustrate, the saliency map 414 associated with the third video frame 406 may represent a temporal saliency map that is generated based on the above formula. In this case, $OS_i$ represents the saliency map 414 associated with the third video frame 406 ("Frame N+2"), $W_o$ represents a weighting factor (e.g., 0.95), $OS_{i-1}$ represents the saliency map 412 associated with the previous video frame (in this case, the second video frame 404), and $Mask_i$ represents the refined mask for the third video frame 406. As shown in the example of FIG. 4, the result of applying the third binary mask 422 is to zero out the background portion of the third video frame 406 (appearing as black).

The fourth video frame 408 ("Frame N+3") may be cropped to generate a fourth cropped image, and spatial dual-layer segmentation may be performed on the fourth cropped image to generate an initial mask, as described above with respect to FIG. 2. Temporal mask refinement may be performed to generate a refined mask, and the refined mask may be used for temporal saliency map generation, as described above with respect to FIG. 2.

To illustrate, the saliency map 416 associated with the fourth video frame 408 may represent a temporal saliency map that is generated based on the above formula. In this case, $OS_i$ represents the saliency map 416 associated with the fourth video frame 408 ("Frame N+3"), $W_o$ represents a weighting factor (e.g., 0.95), $OS_{i-1}$ represents the saliency map 414 associated with the previous video frame (in this case, the third video frame 406), and $Mask_i$ represents the refined mask for the fourth video frame 408. As shown in the example of FIG. 4, the result of applying the fourth binary mask 424 is to zero out the background portion of the fourth video frame 408 (appearing as black).

While the saliency maps and the binary masks illustrated in FIG. 4 appear similar, it will be appreciated that the saliency maps and binary masks change from frame to frame (temporal refinement). In alternative embodiments, to capture more of the person than just the person's face in the foreground for a special effects application, multiple selections may be made by a user (e.g., not just a face color but also a selection of a jacket color, a shirt color, etc.).

Figure 5:
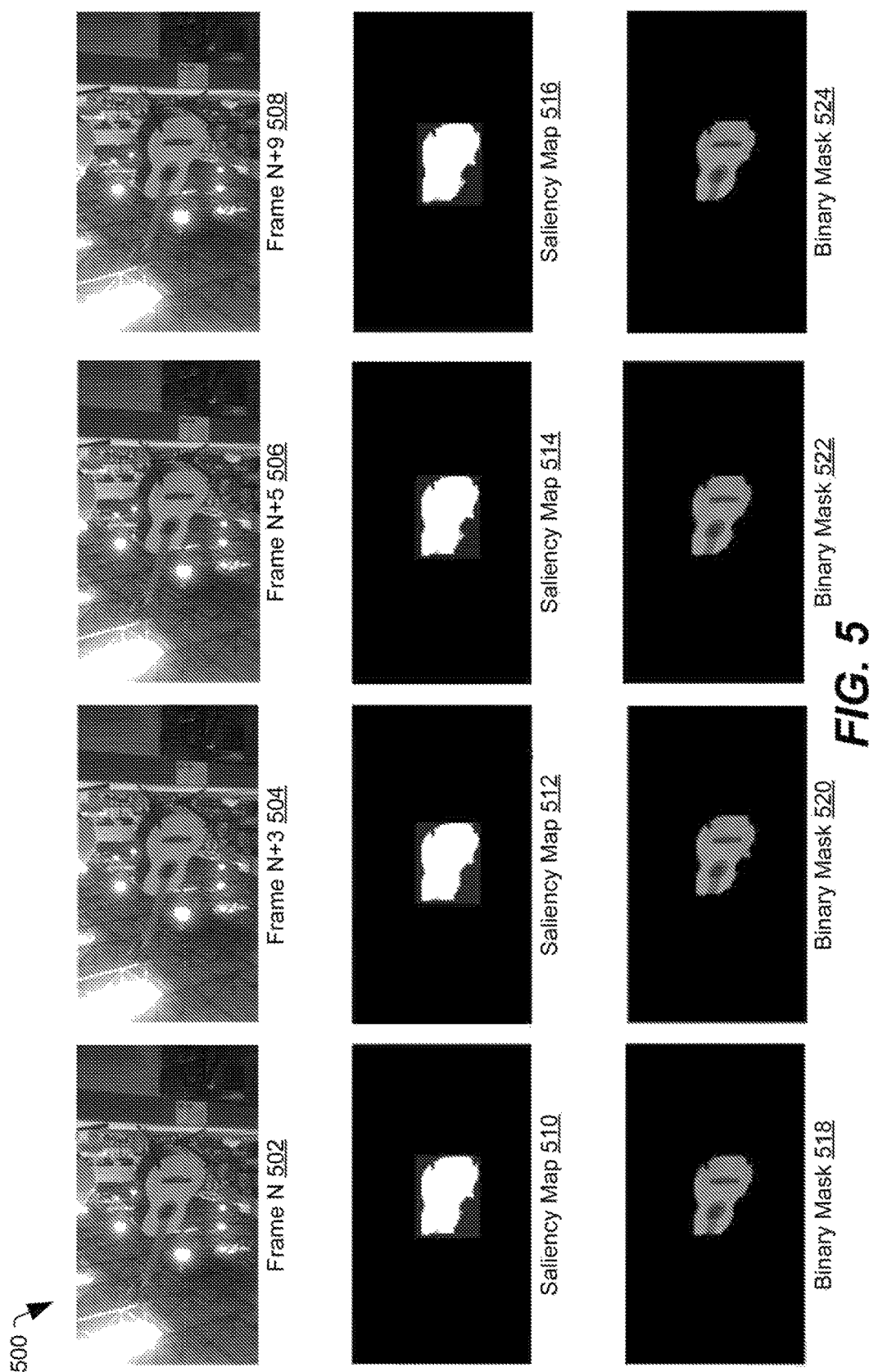
FIG. 5 is a diagram of a particular illustrative embodiment of saliency maps and associated binary masks being applied to a sequence of video frames having a complex background.

Referring to FIG. 5, a particular illustrative embodiment of a method of applying saliency maps and associated binary masks to a sequence of video frames is illustrated and generally designated 500. FIG. 5 illustrates multiple video frames selected from a video frame sequence, along with saliency maps and binary masks associated with each of the video frames. FIG. 5 illustrates the performance of the system of the present disclosure with a sequence of video frames that includes a complex background. In the illustrative example of FIG. 5, a guitar represents an object of interest that appears in the foreground.

In the example illustrated in FIG. 5, selected video frames from the video frame sequence include a first video frame 502 ("Frame N"), a second video frame 504 ("Frame N+3"), a third video frame 506 ("Frame N+5"), and a fourth video frame 408 ("Frame N+9"). A first saliency map 510 is associated with the first video frame 502, a second saliency map 512 is associated with the second video frame 504, a third saliency map 514 is associated with the third video frame 506, and a fourth saliency map 516 is associated with the fourth video frame 508. A first binary mask 518 is associated with the first saliency map 510, a second binary mask 520 is associated with the second saliency map 512, a third binary mask 522 is associated with the third saliency map 514, and a fourth binary mask 524 is associated with the fourth saliency map 516.

In a particular embodiment, each of the saliency maps 510, 512, 514, and 516 may be generated by frame cropping along with spatial dual-layer segmentation to generate a mask. To illustrate, the individual video frames 502, 504, 506, and 508 may be cropped to generate cropped images, and spatial dual-layer segmentation may be performed on the cropped images to generate initial masks, as described above with respect to FIG. 2. Temporal mask refinement may be performed to generate refined masks, and the refined masks may be used for temporal saliency map generation, as described above with respect to FIG. 2.

In the example of FIG. 5, each of the saliency maps 510, 512, 514, and 516 illustrate that a first set of pixels is determined to be associated with a foreground portion (e.g., the guitar) of the particular video frame and another set of pixels is determined to be associated with a background portion of the particular video frame. As shown in the example of FIG. 5, the result of applying the individual binary masks 518, 520, 522, and 524 is to zero out the background portion of the particular video frame (appearing as black).

Figure 6:
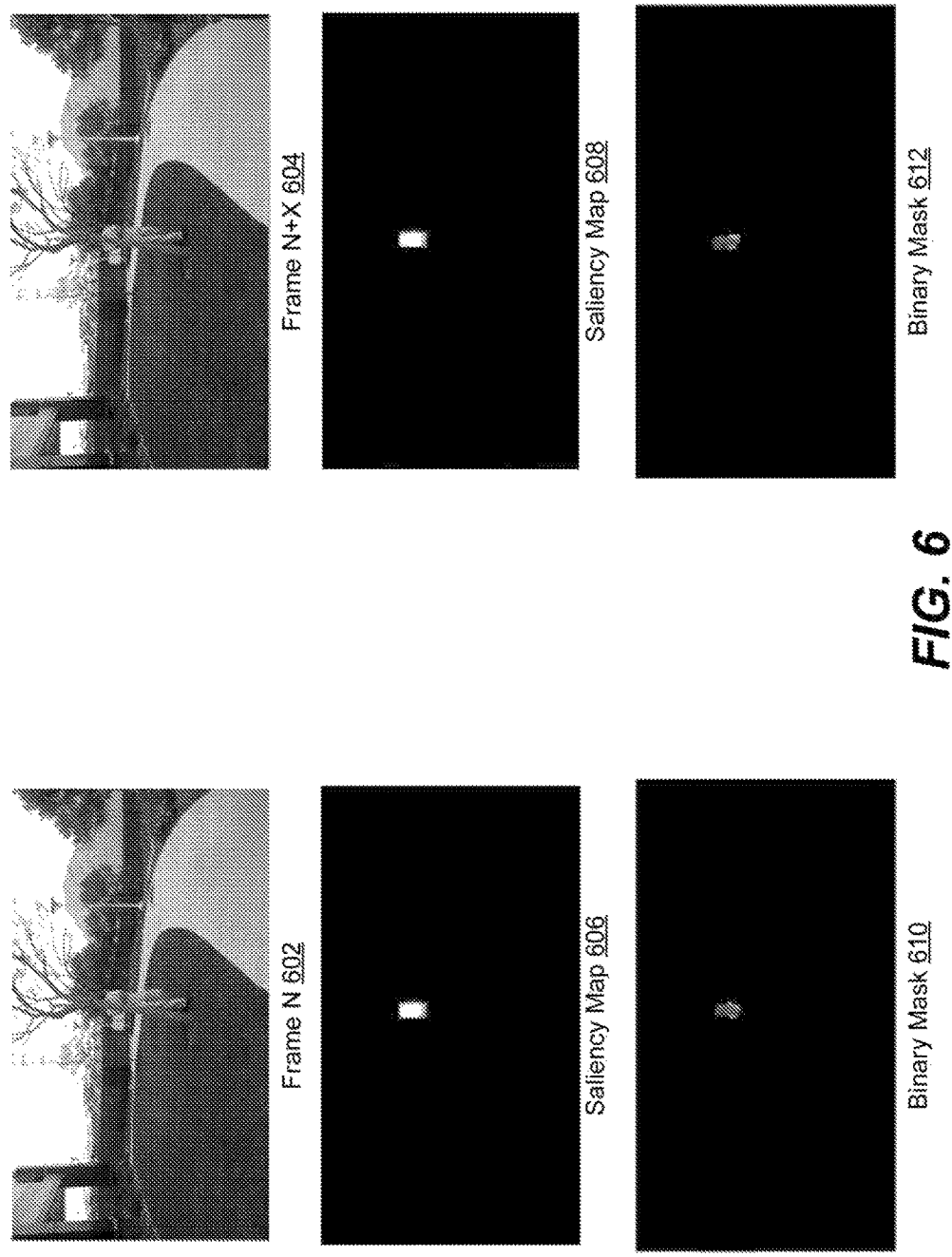
FIG. 6 is a diagram of a particular illustrative embodiment of saliency maps and associated binary masks being applied to a sequence of video frames in which an object of interest is partially obscured.

Referring to FIG. 6, a particular illustrative embodiment of a method of applying saliency maps and associated binary masks to a sequence of video frames is illustrated and generally designated 600. FIG. 6 illustrates two illustrative video frames selected from a video frame sequence, along with saliency maps and binary masks associated with each of the video frames. FIG. 6 illustrates the performance of the system of the present disclosure with a sequence of video frames that includes partial occlusion of the object of interest.

In the example of FIG. 6, the object of interest includes a face, and the face has been partially obscured as a result of the person moving behind a tree. FIG. 6 illustrates that while the face has been partially obscured, the system of the present disclosure may still generate a saliency map that is consistent with the face before occlusion. While the tree may appear in the object bounding box, the system may still identify the object that is being tracked.

In the example illustrated in FIG. 6, selected video frames from the video frame sequence include a first video frame 602 ("Frame N") and a second video frame 604 ("Frame N+X"). A first saliency map 606 is associated with the first video frame 602, and a second saliency map 608 is associated with the second video frame 604. A first binary mask 610 is associated with the first saliency map 606, and a second binary mask 612 is associated with the second saliency map 608.

In a particular embodiment, the first saliency map 606 and the second saliency map 608 may be generated by frame cropping along with spatial dual-layer segmentation to generate a mask. To illustrate, the individual video frames 602 and 604 may be cropped to generate cropped images, and spatial dual-layer segmentation may be performed on the cropped images to generate initial masks, as described above with respect to FIG. 2. Temporal mask refinement may be performed to generate refined masks, and the refined masks may be used for temporal saliency map generation, as described above with respect to FIG. 2.

In the example of FIG. 6, the first saliency map 606 and the second saliency map 608 illustrate that a first set of pixels is determined to be associated with a foreground portion (e.g., the face that is partially obscured by the tree) of the particular video frame and another set of pixels is determined to be associated with a background portion of the particular video frame. As shown in the example of FIG. 6, the result of applying the individual binary masks 610 and 612 is to zero out the background portion of the particular video frame (appearing as black).

Referring to FIGS. 7A and 7B, two illustrative examples of special effect applications that may utilize a temporal saliency map are illustrated and generally designated 700.

FIG. 7A illustrates an example video frame 702 from a "Bokeh effect" special effect application, with a running child as the foreground object of interest. As shown in FIG. 7A, a portion of the image associated with the running child (the foreground object of interest) is sharp, while a remaining portion of the image is out of focus (e.g., blurred). Further, in some cases, an amount of blur may be gradually increased in transitioning between the sharp region and the out-of-focus region (e.g., based on a value between 0 and 255 in a grayscale temporal saliency map).

FIG. 7B illustrates an example video frame 704 from a "black and white effect" special effect application, with a face of a person as the foreground object of interest. As shown in FIG. 7B, a portion of the image associated with the face of the person appears in color, while a remaining portion of the image appears in black and white. Further, in some cases, a gradual transition may occur between the color region and the black and white region (e.g., based on a value between 0 and 255 in a grayscale temporal saliency map).

Figure 8:
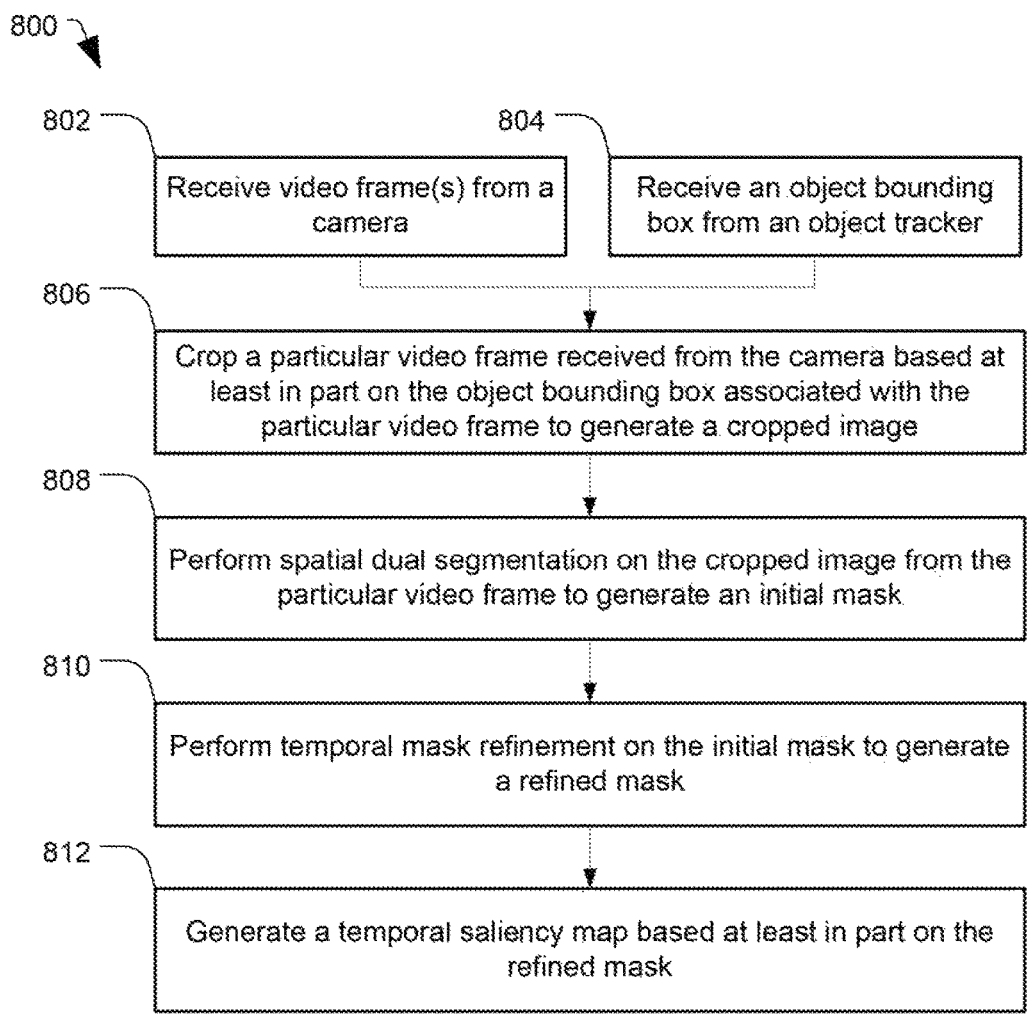
FIG. 8 is a flowchart of a particular illustrative embodiment of a method of generating a temporal saliency map.

Referring to FIG. 8, a particular illustrative embodiment of a method of generating a temporal saliency map is illustrated and generally designated 800.

The method 800 includes receiving video frame(s) from a camera, at 802. The method 800 further includes receiving an object bounding box from an object tracker, at 804. For example, referring to FIG. 2, the object bounding box 204 may be received from the object tracker 122, and the video frame(s) may be received from the camera 104. In some cases, the object tracker 122 may include a "touch to track" or T2T tracker that may be configured to generate the object bounding box 204 in response to a user input (e.g., a single touch input). In some cases, receiving the object bounding box may include receiving data indicative of the box, such as coordinates, dimensions, etc.

The method 800 includes cropping a particular video frame received from the camera based at least in part on the object bounding box associated with the particular video frame to generate a cropped image, at 806. For example, referring to FIG. 2, the frame cropping 206 may be performed to generate the cropped image 208. In some cases, the frame cropping 206 may include determining a portion of a particular video frame that is associated with the object bounding box 204 and increasing a size of the object bounding box 204 to generate the expanded object bounding box 210. As an illustrative, non-limiting example, the frame cropping 206 may include increasing the size of the object bounding box 204 by 30% in both the X direction and the Y direction from a center point and generating the cropped image 208 by determining pixels of the particular video frame that are within the expanded object bounding box 210.

The method 800 further includes performing spatial dual segmentation on the cropped image from the particular video frame to generate an initial mask, at 808. For example, referring to FIG. 2, the spatial dual segmentation 216 may be performed on the cropped image 208 to generate the initial mask 218. The method 800 includes performing temporal mask refinement on the initial mask to generate a refined mask, at 810. For example, referring to FIG. 2, the temporal mask refinement 220 may be performed on the initial mask 218 to generate the refined mask 222.

The method 800 further includes generating a temporal saliency map based at least in part on the refined mask, at 812. For example, referring to FIG. 2, the temporal saliency map generation 226 may include generating the saliency map 228 based at least in part on the refined mask 222.

Various clauses listed herein may present various aspects of the techniques described in this disclosure.

Clause 146516-1A: An apparatus comprising: a processor; an object tracker component executable by the processor to generate information associated with an object bounding box; a frame cropping component executable by the processor to crop a video frame based at least in part on the information associated with the object bounding box to generate a cropped image; a segmentation component executable by the processor to perform spatial multiple-layer segmentation on the cropped image to generate an initial mask; a mask refinement component executable by the processor to perform temporal mask refinement on the initial mask to generate a refined mask; and a temporal saliency map generation component executable by the processor to generate a temporal saliency map based at least in part on the refined mask.

Figure 9:
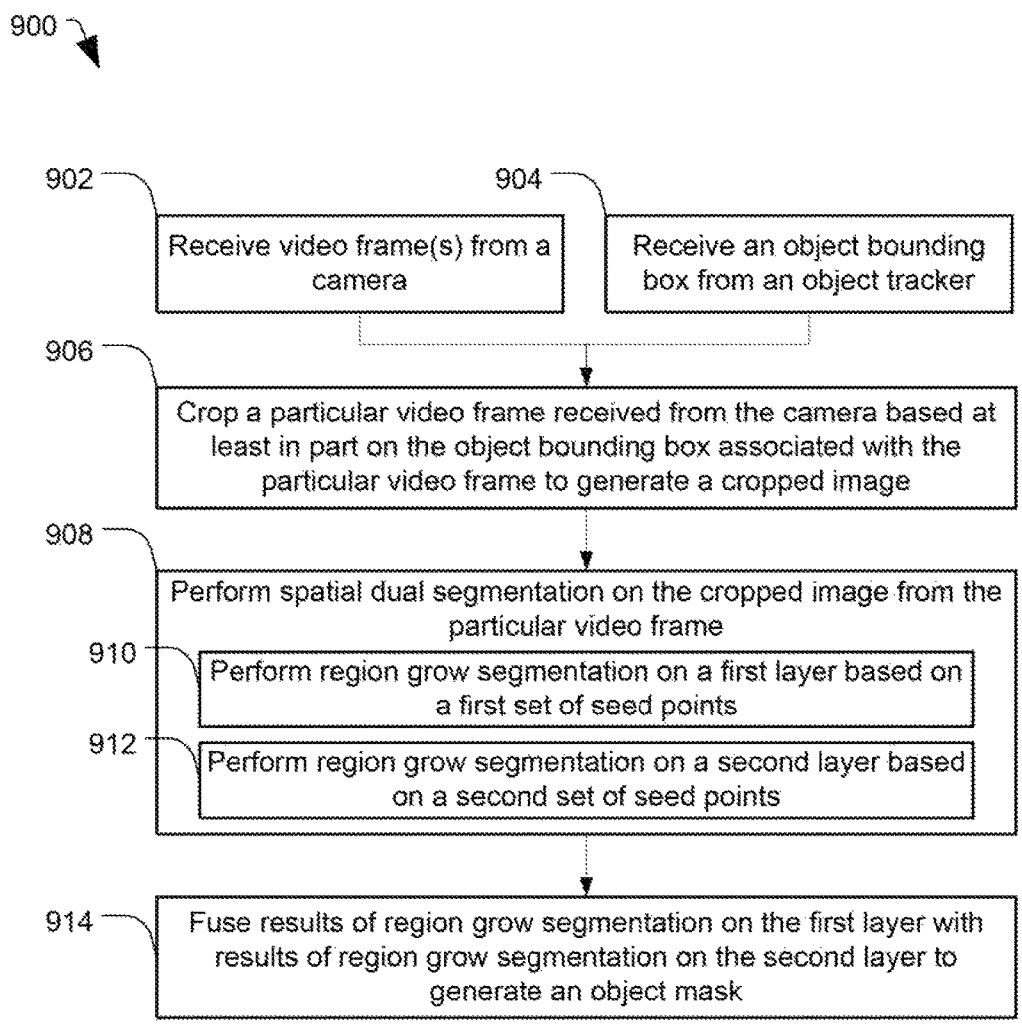
FIG. 9 is a flowchart of a particular illustrative embodiment of a method of performing multiple-layer segmentation to generate an object mask.

Referring to FIG. 9, a particular illustrative embodiment of a method of generating an object mask by performing spatial dual segmentation is illustrated and generally designated 900.

The method 900 includes receiving video frame(s) from a camera, at 902. The method 900 further includes receiving an object bounding box from an object tracker, at 904. For example, referring to FIG. 2, the object bounding box 204 may be received from the object tracker 122, and the video frame(s) may be received from the camera 104. The method 900 includes cropping a particular video frame received from the camera based at least in part on the object bounding box associated with the particular video frame to generate a cropped image, at 906. For example, referring to FIG. 2, the frame cropping 206 may be performed to generate the cropped image 208.

The method 900 further includes performing spatial dual segmentation on the cropped image from the particular video frame, at 908. For example, referring to FIG. 2, the spatial dual segmentation 216 may be performed on the cropped image 208. In the particular embodiment illustrated in FIG. 9, the spatial dual segmentation includes performing region grow segmentation on a first layer based on a first set of seed points, at 910, and performing region grow segmentation on a second layer based on a second set of seed points, at 912.

As an illustrative example, referring to FIG. 2, the first layer may use a cropped boundary (e.g., the rectangular expanded object bounding box 210) as seed points for region growing to the inside, while the second layer may use a reduced size boundary (e.g., reduced in size by two-thirds) as seed points for growing to the outside. That is, the spatial dual segmentation 216 may include region growing inward from the expanded object bounding box 210 as well as region growing outward from the reduced size boundary.

The method 900 further includes fusing the results of the region grow segmentation on the first layer with the results of the region grow segmentation on the second layer to generate an object mask, at 914. For example, referring to FIG. 2, the initial mask 218 may be generated by fusing the results of the region growing associated with the two layers.

The multiple layers may be used to separate a foreground portion of a video frame from a background portion of the video frame. That is, the first layer may represent the background portion, and the region growing may include "growing" inside the object bounding box. That is, the region grow segmentation performed on the first layer may be used to shrink the object bounding box by identifying background pixels for removal. The second layer may represent the foreground portion. Initially shrinking the object bounding box (e.g., by two-thirds) and then performing region grow segmentation may identify foreground pixels. When the results of the region grow segmentation of the two layers are fused, there may be overlapping pixels that are included in both layers. That is, the fused results may be unclear with respect to whether some pixels are associated with the foreground portion or the background portion. Accordingly, in some embodiments, when fusing the results, precedence may be given to the second (foreground) layer.

While FIG. 9 illustrates a particular embodiment in which two layers are used, it will be appreciated that in alternative embodiments more than two layers may be used. As an illustrative, non-limiting example, two object trackers may be used to track two different objects (e.g., one object tracker for a red car in a car race and another object tracker for a green car). In this example, there may be two objects that each represent different foreground portions of a video frame (e.g., a "red car" foreground layer and a "green car" foreground layer) and one background layer.

Clause 146516-1B: A method comprising: receiving one or more video frames from a camera; receiving an object bounding from an object tracker; cropping a particular video frame received from the camera based at least in part on the object bounding box associated with the particular video frame to generate a cropped image; performing spatial dual segmentation on the cropped image from the particular video frame; and fusing results of the spatial dual segmentation to generate an object mask.

Figure 10:
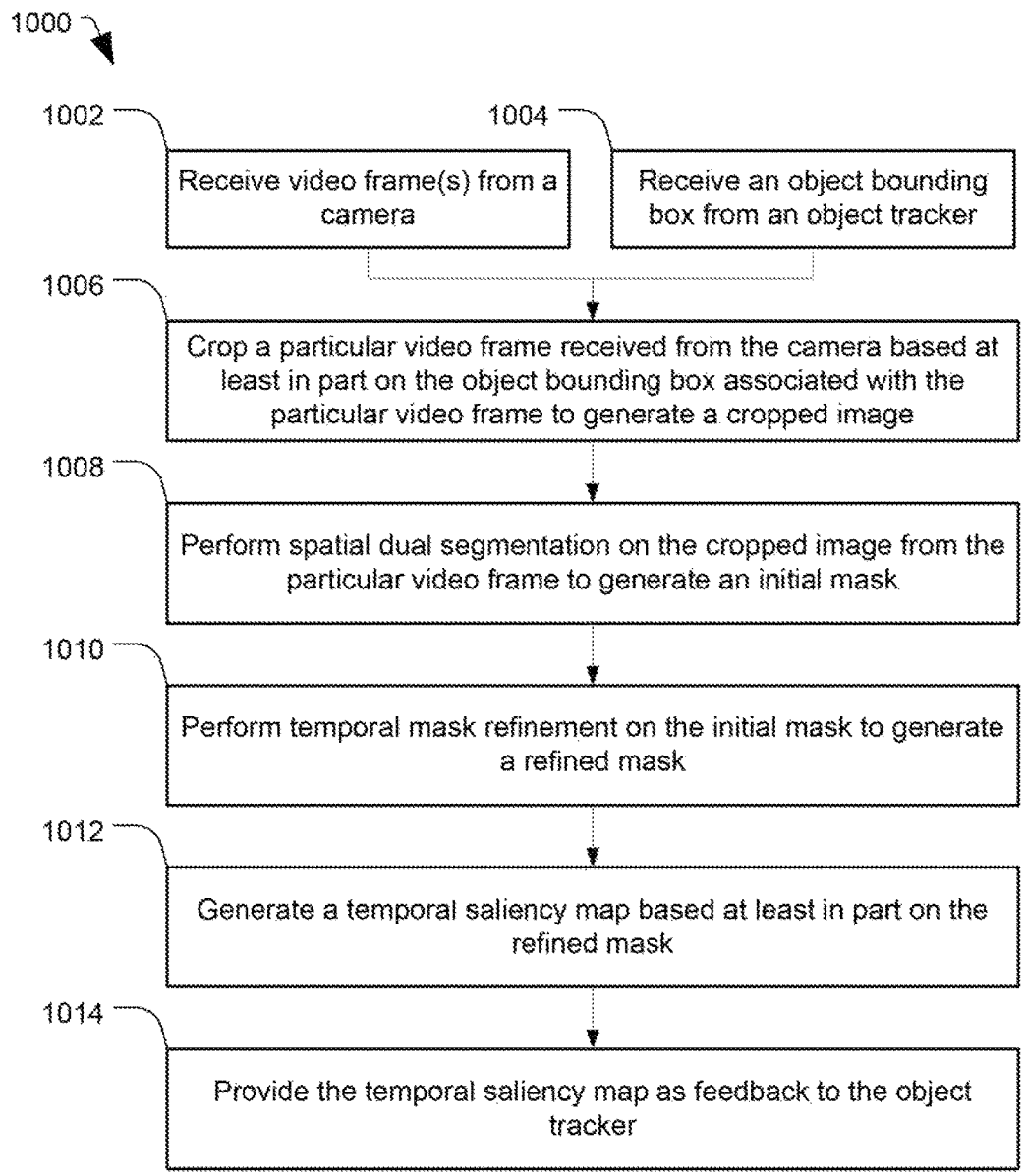
FIG. 10 is a flowchart of a particular illustrative embodiment of a method of providing a temporal saliency map as feedback to an object tracker.

Referring to FIG. 10, a particular illustrative embodiment of a method of providing a temporal saliency map as feedback to an object tracker is illustrated and generally designated 1000.

The method 1000 includes receiving video frame(s) from a camera, at 1002. The method 1000 further includes receiving an object bounding box from an object tracker, at 1004. For example, referring to FIG. 2, the object bounding box 204 may be received from the object tracker 122, and the video frame(s) may be received from the camera 104. The method 1000 includes cropping a particular video frame received from the camera based at least in part on the object bounding box associated with the particular video frame to generate a cropped image, at 1006. For example, referring to FIG. 2, the frame cropping 206 may be performed to generate the cropped image 208.

The method 1000 further includes performing spatial dual segmentation on the cropped image from the particular video frame to generate an initial mask, at 1008. For example, referring to FIG. 2, the spatial dual segmentation 216 may be performed on the cropped image 208 to generate the initial mask 218. The method 1000 includes performing temporal mask refinement on the initial mask to generate a refined mask, at 1010. For example, referring to FIG. 2, the temporal mask refinement 220 may be performed on the initial mask 218 to generate the refined mask 222. The method 1000 further includes generating a temporal saliency map based at least in part on the refined mask, at 1012. For example, referring to FIG. 2, the temporal saliency map generation 226 may include generating the saliency map 228 based at least in part on the refined mask 222.

In the particular embodiment illustrated in FIG. 10, the method 1000 further includes providing the temporal saliency map as feedback to the object tracker, at 1014. For example, referring to FIG. 3, the saliency map 228 may be provided as an input to the object tracker 122. In some cases, both NCC verification components 308 and 310 may be enhanced by applying the saliency map 228 to separate a foreground portion of an image that includes an object of interest from a background portion of the image, potentially resulting in higher tracking accuracy. To illustrate, both NCC verification components 308 and 310 may normally use all pixels inside a bounding box for comparison. The saliency map 228 may be used to narrow down the number of pixels inside the bounding box that are to be used for comparison purposes, potentially resulting in more robust object tracking.

Clause 146516-1C: An apparatus comprising: a processor; an object tracker component executable by the processor to generate information associated with an object bounding box; a segmentation component executable by the processor to perform spatial dual-layer segmentation on a portion of a video frame to generate an initial mask, wherein a boundary of the portion of the video frame is determined based at least in part on the information associated with the object bounding box; a mask refinement component executable by the processor to perform temporal mask refinement on the initial mask to generate a refined mask; and a temporal saliency map generation component executable by the processor to: generate a temporal saliency map based at least in part on the refined mask; and provide the temporal saliency map as feedback to the object tracker component.

Figure 11:
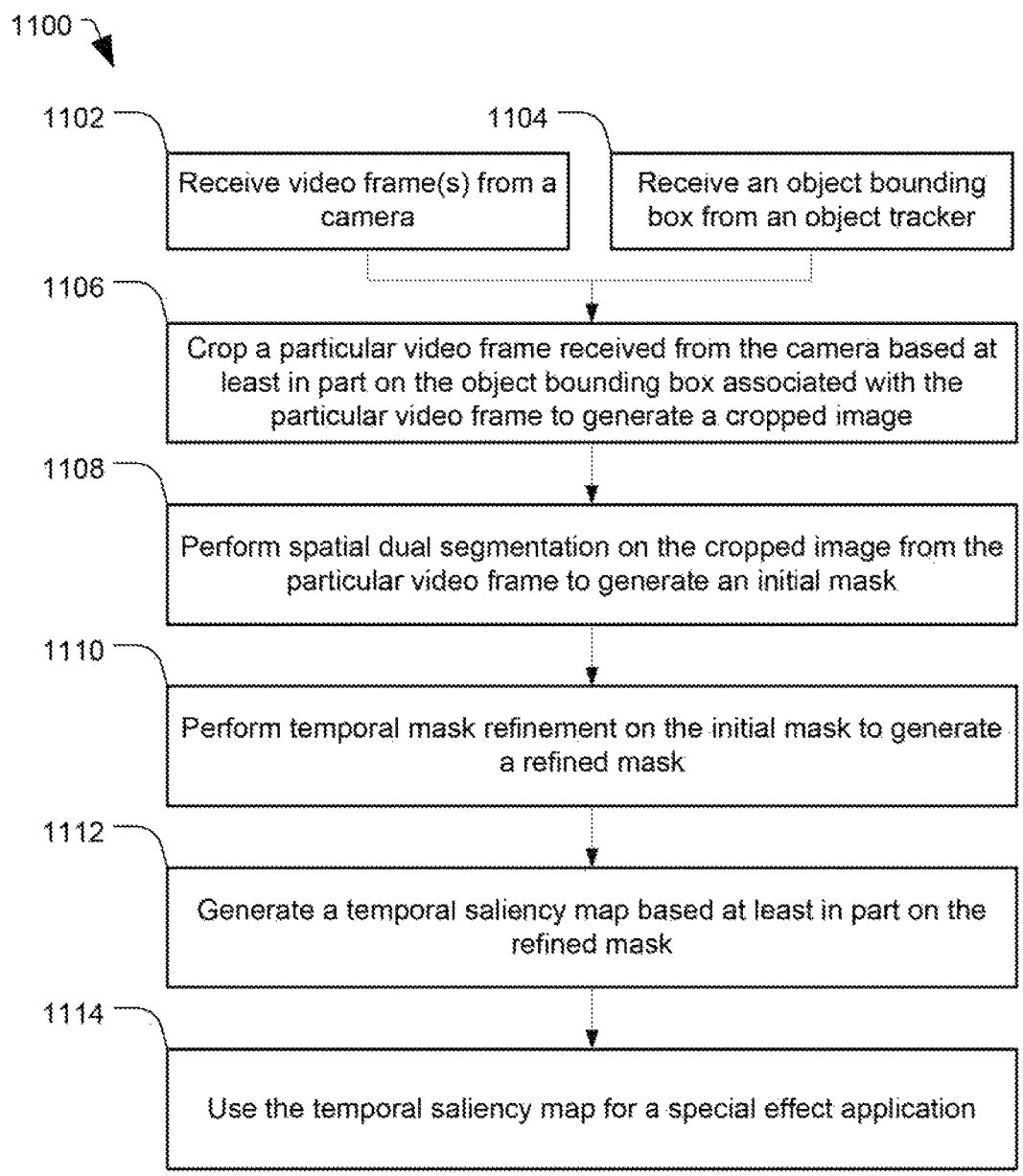
FIG. 11 is a flowchart of a particular illustrative embodiment of a method of using a temporal saliency map for a special effect application.

Referring to FIG. 11, a particular illustrative embodiment of a method of generating a temporal saliency map for use with a special effect application is illustrated and generally designated 1100.

The method 1100 includes receiving video frame(s) from a camera, at 1102. The method 1100 further includes receiving an object bounding box from an object tracker, at 1104. For example, referring to FIG. 2, the object bounding box 204 may be received from the object tracker 122, and the video frame(s) may be received from the camera 104. The method 1100 includes cropping a particular video frame received from the camera based at least in part on the object bounding box associated with the particular video frame to generate a cropped image, at 1106. For example, referring to FIG. 2, the frame cropping 206 may be performed to generate the cropped image 208.

The method 1100 further includes performing spatial dual segmentation on the cropped image from the particular video frame to generate an initial mask, at 1108. For example, referring to FIG. 2, the spatial dual segmentation 216 may be performed on the cropped image 208 to generate the initial mask 218. The method 1100 includes performing temporal mask refinement on the initial mask to generate a refined mask, at 1110. For example, referring to FIG. 2, the temporal mask refinement 220 may be performed on the initial mask 218 to generate the refined mask 222. The method 1100 further includes generating a temporal saliency map based at least in part on the refined mask, at 1112. For example, referring to FIG. 2, the temporal saliency map generation 226 may include generating the saliency map 228 based at least in part on the refined mask 222.

In the particular embodiment illustrated in FIG. 11, the method 1100 further includes using the temporal saliency map for a special effect application, at 1114. For example, FIG. 7A illustrates a special effect application that may use the temporal saliency map for applying the Bokeh effect in order to present a portion of an image as sharp (e.g., the running child), while presenting a remaining portion of the image as out of focus. As another example, FIG. 7B illustrates another special effect application that may use the temporal saliency map for applying a black and white effect in order to present a portion of an image (e.g., the face) in color, while presenting a remaining portion of the image in black and white.

Clause 146516-1D: A method comprising: receiving one or more video frames from a camera; receiving an object bounding from an object tracker; cropping a particular video frame received from the camera based at least in part on the object bounding box associated with the particular video frame to generate a cropped image; performing spatial dual segmentation on the cropped image from the particular video frame to generate an initial mask; performing temporal mask refinement on the initial mask to generate a refined mask; generating temporal saliency map based at least in part on the refined mask; and using the temporal saliency map for a special effect application.

It is noted that clauses described herein may be extended based on additional concepts of the present disclosure to create additional clauses. For example, clause 146516-1A may be extended to create a clause 146516-2A: The apparatus of clause 146516-1A, wherein the spatial multiple-layer segmentation includes spatial dual layer segmentation. As another example, clause 146516-1B may be extended to create a clause 146516-2B: The method of clause 146516-1B, wherein performing spatial dual segmentation comprises performing region grow segmentation on a first layer based on a first set of seed points and performing region grow segmentation on a second layer based on a second set of seed points, wherein a result of the region grow segmentation on the first layer is fused with a result of the region grow segmentation on the second layer to generate the object mask.

From each of the various clauses, it should be understood that an apparatus or device may perform a method or otherwise include means to perform one or more steps of one or more methods described herein. In some instances, these means may include one or more processors. In some instances, the one or more processors may represent a special purpose processor configured by way of instructions stored in a non-transitory computer-readable storage medium. In other words, various aspects of the techniques may provide for a non-transitory computer-readable storage medium having stored thereon instructions that, when executed, cause the one or more processors to perform one or more steps of any one or more the methods the apparatus or device has been configured to perform. Thus, a clause reciting one of an apparatus, a method, or a non-transitory computer-readable storage medium may be used to derive equivalent clauses reciting another of an apparatus, a method, or a non-transitory computer-readable storage medium. Various clauses may be derived from clauses herein for the various apparatuses or devices, methods, and non-transitory computer-readable storage mediums derived as exemplified above. The same may be performed for the various other clauses listed throughout this disclosure.

In particular embodiments, the methods 800-1100 of FIGS. 8-11 may be implemented via hardware (e.g., a field-programmable gate array (FPGA) device, an application-specific integrated circuit (ASIC), etc.) of a processing unit, such as a central processing unit (CPU), a digital signal processor (DSP), or a controller, via a firmware device, or any combination thereof. As an example, the methods 800-1100 of FIGS. 8-11 can be performed by a processor that executes instructions, as described with respect to FIG. 12.

Figure 12:
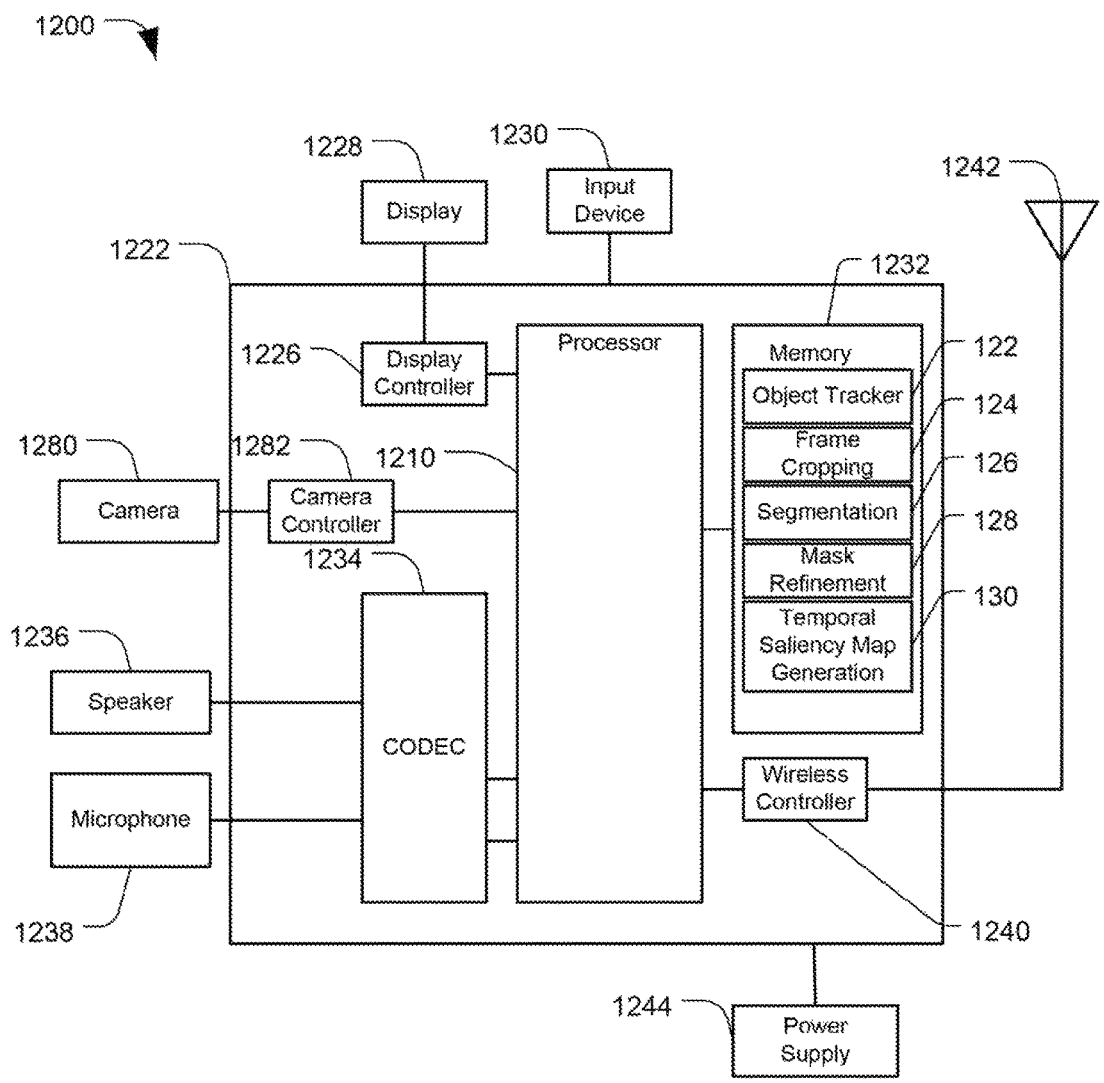
FIG. 12 is a block diagram of a particular illustrative embodiment of a computing device to generate a temporal saliency map.

Referring to FIG. 12, a block diagram of a particular illustrative embodiment of an electronic device including logic to generate a temporal saliency map (e.g., for use with a special effect application) is depicted and generally designated 1200. The device 1200 includes a processor 1210, such as a central processing unit (CPU), coupled to a memory 1232 and also coupled to camera controller 1282. The camera controller 1282 is coupled to a camera 1280. In an illustrative example, the camera 1280 includes the camera 104 of FIG. 1.

FIG. 12 also shows a display controller 1226 that is coupled to the processor 1210 and to a display 1228. The display controller 1226 may correspond to the output interface 106 depicted in FIG. 1. A coder/decoder (CODEC) 1234 can also be coupled to the processor 1210. A speaker 1236 and a microphone 1238 can be coupled to the CODEC 1234.

FIG. 12 also indicates that a wireless controller 1240 can be coupled to the processor 1210 and to an antenna 1242. The wireless controller 1240 may correspond to the network interface 116 depicted in FIG. 1. In a particular embodiment, the processor 1210, the display controller 1226, the memory 1232, the CODEC 1234, the wireless controller 1240, and the camera controller 1282 are included in a system-in-package or system-on-chip device 1222. In a particular embodiment, an input device 1230 and a power supply 1244 are coupled to the system-on-chip device 1222. The input device 1230 may correspond to the input interface 108 of FIG. 1. Moreover, in a particular embodiment, as illustrated in FIG. 12, the display 1228, the input device 1230, the speaker 1236, the microphone 1238, the camera 1280, the antenna 1242, and the power supply 1244 are external to the system-on-chip device 1222. However, each of the display 1228, the input device 1230, the speaker 1236, the microphone 1238, the camera 1280, the antenna 1242, and the power supply 1244 can be coupled to a component of the system-on-chip device 1222, such as an interface or a controller.

In the embodiment illustrated in FIG. 12, the memory 1232 includes (e.g., processor-executable instructions corresponding to) the object tracker component 122, the frame cropping component 124, the segmentation component 126, the mask refinement component 128, and the temporal saliency map generation component 130, as described above with respect to FIG. 1. In alternative embodiments, all or a portion of one or more of the components 122-130 may be implemented using hardware (e.g., in the processor 1210).

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary non-transitory (e.g., tangible) storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
receiving information associated with an object bounding box from an object tracker;
cropping a video frame based at least in part on the object bounding box to generate a cropped image;
performing, at a processor, spatial dual-layer segmentation on the cropped image to generate an initial mask;
performing, at the processor, temporal mask refinement on the initial mask to generate a refined mask; and
generating a temporal saliency map based at least in part on the refined mask.

2. The method of claim 1, further comprising providing the temporal saliency map to a special effect application.

3. The method of claim 2, wherein the special effect application is a Bokeh effect application.

4. The method of claim 2, wherein the special effect application is a black and white effect application.

5. The method of claim 2, wherein the special effect application is a lens effect application.

6. The method of claim 1, further comprising generating a binary mask based on the temporal saliency map.

7. The method of claim 6, further comprising applying the binary mask to the video frame for a special effect application.

8. The method of claim 1, wherein performing the spatial dual-layer segmentation includes:
performing region grow segmentation on a first layer of an image based on a first set of seed points; and
performing region grow segmentation on a second layer of the image based on a second set of seed points.

9. The method of claim 8, wherein the first set of seed points includes a first plurality of points associated with a first boundary region that is expanded in size with respect to the object bounding box.

10. The method of claim 9, wherein the second set of seed points includes a second plurality of points associated with a second boundary region that is reduced in size with respect to the object bounding box.

11. The method of claim 10, further comprising fusing results of the region grow segmentation on the first layer of the image with results of the region grow segmentation on the second layer of the image to generate the initial mask.

12. An apparatus comprising:
a processor;
an object tracker component executable by the processor to generate information associated with an object bounding box;
a frame cropping component executable by the processor to crop a video frame based at least in part on the information associated with the object bounding box to generate a cropped image;
a segmentation component executable by the processor to perform spatial multiple-layer segmentation on the cropped image to generate an initial mask;
a mask refinement component executable by the processor to perform temporal mask refinement on the initial mask to generate a refined mask; and
a temporal saliency map generation component executable by the processor to generate a temporal saliency map based at least in part on the refined mask.

13. The apparatus of claim 12, wherein the spatial multiple-layer segmentation includes spatial dual-layer segmentation.

14. The apparatus of claim 12, wherein the mask refinement component is executable by the processor to align the initial mask with one or more masks associated with one or more second video frames that precede the video frame in a sequence of video frames.

15. The apparatus of claim 14, wherein the mask refinement component is executable by the processor to align the initial mask with the one or more masks associated with the one or more second video frames by removing one or more pixels that represent outliers for a particular video frame.

16. The apparatus of claim 15, wherein the one or more pixels appear in the particular video frame but do not appear in at least one of the one or more second video frames.

17. The apparatus of claim 12, further comprising a camera to capture the video frame.

18. A method comprising:
receiving information associated with an object bounding box from an object tracker;
performing, at a processor, spatial dual-layer segmentation on a portion of a video frame to generate an initial mask, wherein a boundary of the portion of the video frame is determined based at least in part on the information associated with the object bounding box;
performing, at the processor, temporal mask refinement on the initial mask to generate a refined mask;
generating a temporal saliency map based at least in part on the refined mask; and
providing the temporal saliency map as feedback to the object tracker.

19. The method of claim 18, wherein the temporal saliency map is provided to a normalized cross-correlation (NCC) verification component that is associated with a detection component of the object tracker.

20. The method of claim 19, wherein the NCC verification component is configured to apply the temporal saliency map to an image in order to separate a foreground portion of the image that includes an object of interest from a background portion of the image.

21. The method of claim 20, wherein the NCC verification component is configured to determine a subset of pixels within the object bounding box based on the temporal saliency map, wherein the subset of pixels are to be used by the NCC verification component for one or more comparison operations.

22. The method of claim 21, wherein the subset of pixels represents the foreground portion of the image that includes the object of interest.

23. The method of claim 22, wherein a second subset of pixels representing the background portion of the image is not used by the NCC verification component for the one or more comparison operations.

24. The method of claim 19, wherein the NCC verification component utilizes an object appearance model for object verification, and wherein the object appearance model is updated based at least in part on an output of the NCC verification component associated with the temporal saliency map.

25. An apparatus comprising:
a processor;
an object tracker component executable by the processor to generate information associated with an object bounding box;
a segmentation component executable by the processor to perform spatial dual-layer segmentation on a portion of a video frame to generate an initial mask, wherein a boundary of the portion of the video frame is determined based at least in part on the information associated with the object bounding box;
a mask refinement component executable by the processor to perform temporal mask refinement on the initial mask to generate a refined mask; and
a temporal saliency map generation component executable by the processor to:
generate a temporal saliency map based at least in part on the refined mask; and
provide the temporal saliency map as feedback to the object tracker component.

26. The apparatus of claim 25, wherein the temporal saliency map is further generated based on a saliency map associated with a second video frame that precedes the video frame in a sequence of video frames.

27. The apparatus of claim 26, wherein a first weighting factor is applied to the saliency map associated with the second video frame.

28. The apparatus of claim 27, wherein a second weighting factor is applied to the refined mask.

29. The apparatus of claim 28, wherein the second weighting factor is determined based on the first weighting factor.

30. The apparatus of claim 28, wherein the first weighting factor is larger than the second weighting factor to apply a larger weight to the saliency map associated with the second video frame than the refined mask.

* * * * *